United States Patent [19]

Sinclair

[11] Patent Number: 5,277,860
[45] Date of Patent: Jan. 11, 1994

[54] PROCESS FOR MAKING AN ALL-PLASTIC ROD END

[76] Inventor: William S. Sinclair, 14010 Clark Ct., Holland, Pa. 18966

[21] Appl. No.: 940,065

[22] Filed: Sep. 3, 1992

[51] Int. Cl.⁵ .............................................. B29C 45/14
[52] U.S. Cl. ................................... 264/242; 264/264; 425/DIG. 34
[58] Field of Search ................... 264/242, 259, 264; 425/DIG. 34

[56] References Cited

U.S. PATENT DOCUMENTS

| | | | |
|---|---|---|---|
| 3,094,376 | 6/1963 | Thomas | 264/242 |
| 3,197,535 | 7/1965 | Morin | 425/DIG. 34 |
| 3,259,963 | 7/1966 | White | 264/242 |
| 3,591,669 | 7/1971 | Membry | 264/242 |
| 3,941,495 | 3/1976 | Duncan | 264/242 |
| 4,049,231 | 9/1977 | Lutz | 425/DIG. 34 |
| 4,290,181 | 9/1981 | Jackson | 264/242 |
| 4,430,285 | 2/1984 | Runyan et al. | 264/264 |
| 4,649,010 | 3/1987 | Bennett et al. | 264/242 |
| 4,680,837 | 7/1987 | Rubenstein | 264/242 |

FOREIGN PATENT DOCUMENTS 0027770 4/1981 European Pat. Off. ............ 264/242

Primary Examiner—Jan H. Silbaugh
Assistant Examiner—Brian J. Eastley
Attorney, Agent, or Firm—Anthony J. Casella; Gerald E. Hespos

[57] ABSTRACT

A process for making an all-plastic rod end to enable an articulated linking of two members. The process includes providing first and second split bearing raceway members each of which defines one-half of an annular bearing raceway and a stem having an open ended semi-cylindrical recess. A spherical ball dimensioned to fit in the annular bearing raceway also is provided. The spherical ball is placed into the first split bearing raceway member, and the second split bearing raceway member is placed over the first split bearing raceway member to define a complete annular bearing raceway that encases the ball. The process continues by molding a plastic housing around the split bearing raceway members but spaced from the spherical ball to enable free movement of the spherical ball therein.

4 Claims, 2 Drawing Sheets

PROCESS FOR MAKING AN ALL-PLASTIC ROD END

BACKGROUND OF THE INVENTION

Spherical rod ends provide an articulated linkage between the connection of two separate assemblies. Spherical rod ends can be easily adapted for many different types of applications. In use, the spherical rod end enables the linkage of two separate assemblies, such that the linkage is articulated between the two separate assemblies. The articulation of the linkage is provided through the spherical ball of the spherical rod end. In use, the spherical ball engages a first separate assembly, while an elongated cylindrical member of the spherical rod end engages a second separate assembly. Thus, the spherical rod end operates to articulately link two separate assemblies.

The prior art spherical rod end comprises a metallic housing and a metallic ball. The metallic ball is provided with a central hole for engaging a separate assembly. The metallic housing is molded to form a spherical race around the metallic ball such that the metallic ball is generally able to move freely within the metallic housing. The metallic housing also forms an elongated cylindrical member. The prior art metallic spherical rod end quite often was able to sufficiently support loads in excess of one thousand pounds.

The prior art spherical rod end possesses distinct disadvantages. Since the prior art spherical rod end is constructed entirely of a metallic substance, it is prone to be heavy and is expensive to manufacture as it requires a protective, non-corrosive secondary finishing to avoid the effects of oxidation and corrosion. Additionally, quite often the spherical ball requires lubrication in order to maintain its free movement within the race of the metallic housing. Secondly, when both the spherical ball and housing are fitted together, the metallic embodiments of the ball and housing produce a loose tolerance with a high wear factor between the spherical ball and metallic housing. Further, since the metallic housing is directly molded around the metallic ball, quite often this tends to fuse the ball to the housing inhibiting the spherical ball's ability to move freely, therein requiring an additional manufacturing process to free the ball from the metallic housing. Furthermore, if the metallic ball is not perfectly round, the ball typically will be locked into place in the housing, devoid of any movement. Still further, in order to provide the elongated cylindrical member with a threaded portion, the threading of the elongated cylindrical member has to be formed either through a secondary process or through the molding process, requiring still another additional monetary expense. In conclusion, the prior art spherical rod end has numerous setbacks, and any attempt to overcome any of these setbacks, had to be performed at a considerable monetary expense.

An example of a metallic spherical rod end is manufactured by Superior Linkage Products of New Haven, Indiana. The Superior Linkage device included a metallic ball and a metallic housing, both of which are plated for corrosion resistance. Additionally, the metal used for both the ball and housing is of a low carbon steel having the surface hardened for wear resistance. The Superior Linkage Products device is further provided with a bearing raceway constructed of a self-lubricating, reinforced nylon. In the process of manufacturing the Superior Linkage Products spherical rod end, first a metallic ball is formed with a central hole. The metallic housing is then molded to form a metallic raceway around the metal ball, with a cylindrical member extending away from the metallic raceway. Next, a self-lubricating, reinforced nylon is injected into the metallic raceway to provide for a bearing raceway. The cylindrical member may or may not be formed with an outer circumferential surface and/or an inner circumferential surface. However, even though the Superior Linkage Products spherical rod end is able to overcome some of the shortcomings of the prior art, the Superior Linkage Products device is expensive to manufacture. Additionally, the Superior Linkage Products device is primarily constructed of a metallic substance, and thus it is heavy.

An attempt has been made in the prior art to manufacture an all-plastic rod end. Adams et al. U.S. Pat. No. 5,129,148 teaches of a method for making a non-metallic, fiber reinforced rod end bearing assembly. This method provides an all-plastic rod end comprising; two discrete races, a spherical ball and a housing cover. The two races operate to support the spherical ball while they are in face-to-face alignment with one another. The two race members threadingly engage the housing, therein providing a means to gain access to the spherical ball while it is contained in the rod end. However, since the two races members are only threadingly engaged with the housing, and are not encased by the housing, this makes the Adams et al. rod end particularly the threaded engagement portion of the race members and housing, susceptible to fatigue and breakage when in use for a prolonged period of time.

Accordingly, it is an object of the subject invention to provide a new and improved spherical rod end without the shortcomings as forementioned.

Another object of the subject invention is to provide a new and improved spherical rod end which is constructed entirely of a lightweight material, such as plastic.

An additional object of the subject invention is to provide a new and improved spherical rod end which is constructed entirely of a corrosion resistant material.

Still a further object of the subject invention is to provide a spherical rod end which can be easily manufactured for various types of applications.

It is another object of the subject invention to provide a new and improved process for manufacturing a spherical rod end that enables a spherical rod end to be formed at a reasonable cost, and which is capable of linking separate assemblies, with an articulated linkage between the two separate assemblies.

SUMMARY OF THE INVENTION

The subject invention is directed at a new and improved spherical rod end made entirely of plastic and a method of making the same. The subject invention provides for a lightweight, corrosion resistant all-plastic rod end which is capable of articulately linking two separate assemblies.

The subject all-plastic rod end is preferably constructed of a high heat, chemical and corrosion resistant plastic. The all-plastic rod end comprises an interfitting arrangement of a spherical ball and a split bearing raceway housing, both of which are encased in a plastic molded housing. The spherical ball is provided with an elongated central hole along it's diameter so as to engage a separate assembly. Alternatively, the spherical ball can be provided with a stud projecting radially outward from the outer surface of the spherical ball to similarly enable engagement with a separate assembly. The split bearing raceway housing includes two similar members, each of which is provided with a bearing raceway formed to an elongated stem having an inner cylindrical surface and an outer cylindrical surface. The elongated stem forms an open end opposite the bearing raceway. Further, the plastic molded housing integrally encases both the spherical ball and split bearing raceway housing, such that the integrally plastic molded housing does not interfere with the free movement of the spherical ball, and enables the open end of the split bearing raceway to be connected to a separate assembly.

In the process of making the subject invention, the spherical ball, split bearing raceway housing and molded plastic housing are formed together as an integral structure. First, the spherical ball is placed in a bearing raceway in one of the interfitting split bearing raceway housing members. Next, the second split bearing raceway housing member is interfitted with the first split bearing raceway housing member, such that the two members interfit together to form a bearing raceway which allows free movement of the spherical ball. Further, the interfitted members of the split bearing raceways form an elongated stem which has an outer cylindrical surface and an inner cylindrical surface, forming an open end remote from the bearing raceway. Thereafter, the plastic housing is molded over the entire outer surface of the split bearing raceway housing so as to form an integral housing which does not interfere with the free movement of the spherical ball nor the open end of the interfitted split bearing raceway members.

In use, the subject spherical rod ends links two separate assemblies with the linkage being articulated between the two separate assemblies. A first separate assembly engages the elongated stem of the housing while a second separate assembly engages the central hole, or in the alternative, the stud of the spherical ball. The spherical ball therein provides the articulated linkage between the two separate assemblies. The subject invention enables the separate assemblies to be linked together using the lightweight all-plastic rod end, and even though it may not be capable of supporting loads in excess of one thousand pounds, such as the prior art spherical rod end, its lightweight structure is advantageous over such prior art when applied to loads of only a few hundred pounds. Furthermore, the subject all-plastic rod end does not require the additional process of injecting a self-lubricating reinforced nylon in the housing to overcome some of the shortcomings of the prior art. Moreover, the process of the subject invention for manufacturing the all-plastic rod end may be carried out at a low manufacturing cost.

DETAILED DESCRIPTION OF THE PREFERRED EMBODIMENT

Figure 1:
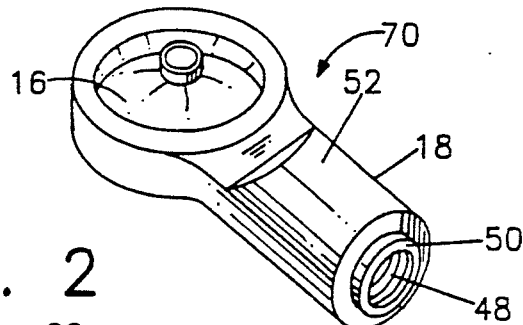
FIG. 1 is a perspective view of the all-plastic rod end of the subject invention.

Referring to FIGS. 1-5, the subject all-plastic spherical rod end is designated with the reference numeral 10. The subject all-plastic rod end 10 includes similar split bearing raceway members 12 and 14, a spherical ball 16 and a molded plastic housing 18.

Figure 2:
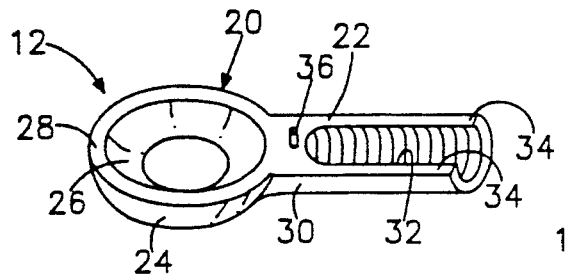
FIG. 2 is a perspective view of a split bearing raceway housing including an alignment button and forming a portion of the subject invention al -plastic rod end.
Figure 3:
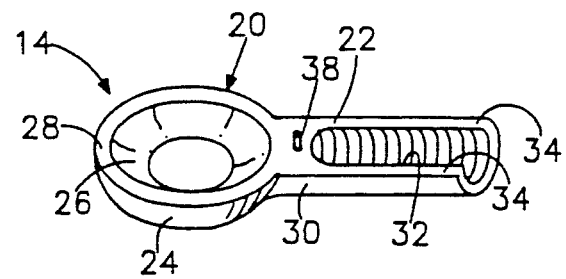
FIG. 3 is a perspective view of a split bearing raceway housing including an alignment hole and forming a portion of the subject invention all-plastic rod end.

The split bearing raceway members 12 and 14, as shown in FIGS. 2 and 3, are similar and thus like numbers correspond respectively to each split bearing raceway member 12 and 14. The split bearing raceway members 12, 14 are unitarily formed and include a bearing raceway 20 connected to an elongated stem 22. The bearing raceway 20 is provided with an outer truncated partial spherical surface 24 and an inner truncated partial spherical surface 26, with a rim 28 therebetween. The elongated stem 22 includes a partial cylindrical outer surface 30. A portion of the elongated stem 22 is further provided with a partial cylindrical inner surface 32 with opposed longitudinal edges 34,34 between the inner partial cylindrical surface 32 and the outer partial cylindrical surfaces 30. Split bearing raceway 12 is provided with an alignment post 36 intermediate the bearing raceway 20 and the partial cylindrical inner surface 32. Split bearing raceway 14 is provided with an alignment hole 38 in the identical location as to the alignment post 36 location on the split bearing raceway 12. The alignment hole 38 is sized in accordance with the configuration and size of the alignment button 36 such that the alignment post 36 frictionally engages the alignment hole 38. The partial cylindrical inner surface 32 of each split bearing raceway 12, 14 is provided with either a threaded portion, an annular grove or a bayonet lock connection.

Figure 4:
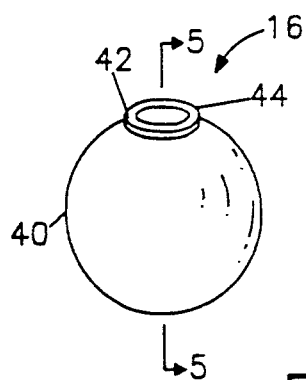
FIG. 4 is a perspective view of the plastic spherical ball of the subject all-plastic rod end.
Figure 5:
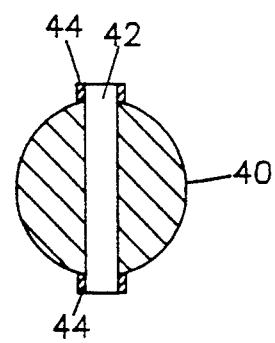
FIG. 5 is a cross-sectional view taken along line 5—5 in FIG. 4.

Referring to FIGS. 4 and 5, the spherical ball 16 includes an outer spherical surface 40 having a central hole 42 extending diametrically therethrough. The spherical ball 16 further includes an annular rim 44,44 adjacent both ends of the central hole 42 projecting outwardly along the outer spherical surface 40 of the spherical ball 16. Each annular rim 44 functions to limit the range of rotational movement of the spherical ball 16 when encased in the final configuration of the rod end 10, thereby precluding the linkage extending through central hole 42 from contacting the rim 28 of the rod end 10.

Figure 6:
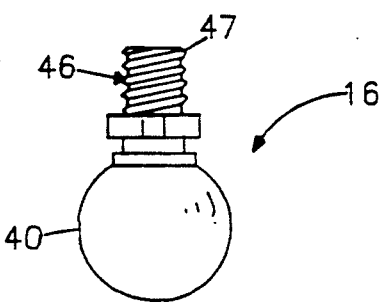
FIG. 6 is a side elevational view of a split bearing raceway housing with the plastic spherical ball and depicting the initial step in the subject process of making an all-plastic rod end.

In an alternative embodiment of the spherical ball 16, as shown in FIG. 6, the spherical ball 16 is provided with an elongated stud 46 being either rigidly connected o formed to the spherical ball 16. The elongated stud 46 projects radially outward from the outer spherical surface 40 of the spherical ball 16. The elongated stud 46 may be provided with a threaded portion 47 to enable threaded engagement with a separate assembly. However, it is to be understood that the threaded portion 47 provided on the elongated stud 46 is of example only, and said elongated stud 46 may have any other comparable engagement means provided thereon.

Figure 7:
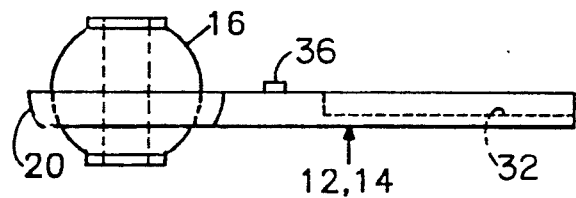
FIG. 7 is a side elevational view of the split bearing raceway housing members interfitted together about the ball, and depicting the second step in the subject process of making the all-plastic rod end, preparatory to the molding of the plastic housing.
Figure 8:
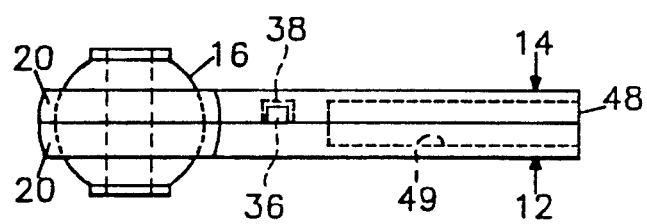
FIG. 8 is a side elevational view of the plastic molded housing forming an integral assembly over the interfitted members of the split bearing raceway housings and ball, and depicting the final step of the subject process for making an all-plastic rod end.
Figure 9:
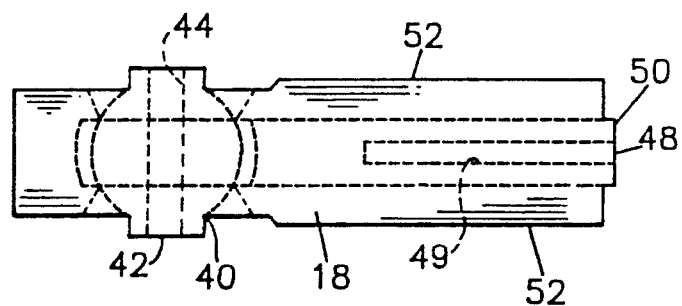
FIG. 9 is a front elevational view of the plastic molded housing forming an integral assembly over the interfitted members of the split bearing raceway housings and the ball.

Turning to FIGS. 7-9, the new and improved process of the subject invention for making the all-plastic rod end 10 includes the step of, first, placing the spherical ball 16 into the bearing raceway 20 of a split bearing raceway 12, 14 as shown in FIG. 7. Next, turning to FIG. 8, the remaining split bearing raceway 12, 14 is interfitted with the split bearing raceway 12 or 14, containing the spherical ball 16, at which time the bearing raceway 20 surrounds the spherical ball 16 whereupon the alignment post 36 is engaged with the alignment hole 38. The spherical ball 16 is therein partially encased in the bearing raceway 20 of split bearing raceway members 12 and 14, such that the spherical ball 16 is able to pivot freely therein. Additionally, the partial cylindrical inner surface 32 of the interfitted split bearing raceways, 12 and 14, form an inner cylindrical surface 49 having an open end 48 remote from the spherical ball 16.

Figure 10:
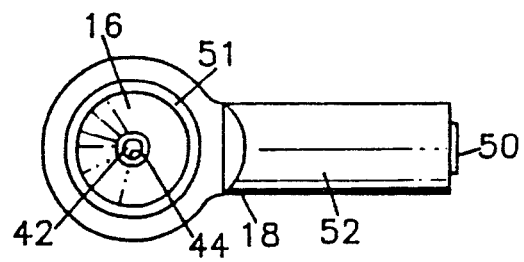
FIG. 10 is a side elevational view of the plastic spherical ball being provided with an elongated stud projecting radially outward thereof.

Referring to FIG. 9, in the final step of the subject process, the plastic housing 18 is molded around the spherical ball 16 and the split bearing raceways 12 and 14, to form an integral structure. The plastic housing 18 is molded so as to ensure that the spherical ball 16 is freely pivotally movable and that the open end 48 of the split bearing raceway members 12 and 14 projects slightly beyond the spaced end of the molded plastic housing 18 from the spherical ball 16, forming an annular rim 50, as shown in FIGS. 1 and 9. Further, the plastic housing 18 is molded to form an annular ridge 51 adjacent the outer circumference of the spherical ball 16. The annular ridge 51 functions to limit the rotational movement of the spherical ball 16. The annular ridge 51 is dimensioned to bear against the annular rim 44 of the spherical ball 16 when the spherical ball 16 is pivoted to the degree that the annular rim 44 abuts against the annular ridge 5 of the molded plastic housing (see FIG. 10). Additionally, the plastic housing 18 is molded around the entire outer surface of the split bearing raceways 12, 14 so as to form a unitary molded structure. The plastic housing 18 may be formed so as to provide a cylindrical outer surface 52 along the end of the plastic housing 18. Moreover, the plastic housing is molded such that it does not interfere with the open end 48 of the inner cylindrical surface 49 of the interfitted split bearing raceways 12, 14. The cylindrical outer surface 52 may be further provided with a threaded portion.

In use, the subject spherical rod end 10 articulately links two separate assemblies. One separate assembly engages the spherical ball 16 by a rod connection extending through the central hole 42. A second separate assemble either engages the outer surface 52 or the inner cylindrical surface 49 of the plastic spherical rod end 10. As mentioned above, the outer surface 52 of the plastic molded housing 18 may be provided with a threaded portion to enable engagement to a separate assembly. Additionally, the inner cylindrical surface 49 of the all-plastic rod end 10 may either be provided with a threaded portion, an annular groove or a bayonet lock connection to similarly enable engagement of the subject rod end 10 to a separate assembly. Thereafter, the free pivotal movement of the spherical ball 16 functions to provide an articulated linkage between the two separate assemblies.

Although the subject all-plastic rod end and method of making the same has been described by reference to preferred embodiments and processes, it will be apparent that many other modifications could be devised by those skilled in the art that would fall within the spirit and scope of the present invention as defined by the appended claims.

I claim:

1. A process for forming a plastic spherical rod end, said process comprising the steps of:

providing first and second split bearing raceway members, each of which defines one-half of an annular bearing raceway having a central aperture with a selected diameter, and an elongated stem extending from said annular bearing raceway, each said stem having an open ended semi-cylindrical recess, providing a spherical ball having a diameter less than the annular bearing raceway, but greater than the diameter of said central aperture in said annular bearing raceway, said ball having a central hole extending diametrically therethrough, placing the second split bearing raceway member onto said first split bearing raceway member to form a complete annular bearing raceway, such that said spherical ball is encased and rotatable in said annular bearing raceway, and such that said elongated stems are in alignment to form a cylinder having an open end;

then molding a plastic housing around said complete annular bearing raceway but spaced from the central apertures therein and from the spherical ball, thereby forming an integral assembly which encases the split bearing raceway members but does not inhibit movement of the spherical ball and allows connection to the open ended cylinder defined by the elongated stems of the split bearing raceway members.

2. A process for forming a plastic spherical rod end as in claim 1, wherein said plastic molded housing is formed such that said elongated stems project beyond said molded plastic housing.

3. A process for forming a plastic spherical rod end as in claim 1, wherein said plastic molded housing is formed to provide an annular ridge adjacent to the outer circumference of said spherical ball.

4. A process as in claim 1, wherein the step of providing a spherical ball further comprises providing a spherical ball having first and second annular rims projecting from diametrically opposed locations on said ball and surrounding the central holes, said rims being dimensioned to pass through said central apertures of said split bearing raceway members, and wherein said step of placing said spherical ball into the half of the annular bearing raceway of said first split bearing raceway member further comprises passing said first annular rim of said ball through the central aperture of said first split bearing raceway member.

* * * * *